Dec. 28, 1937.　　　F. A. NODINE　　　2,103,633
THERMOMETER
Filed March 19, 1937
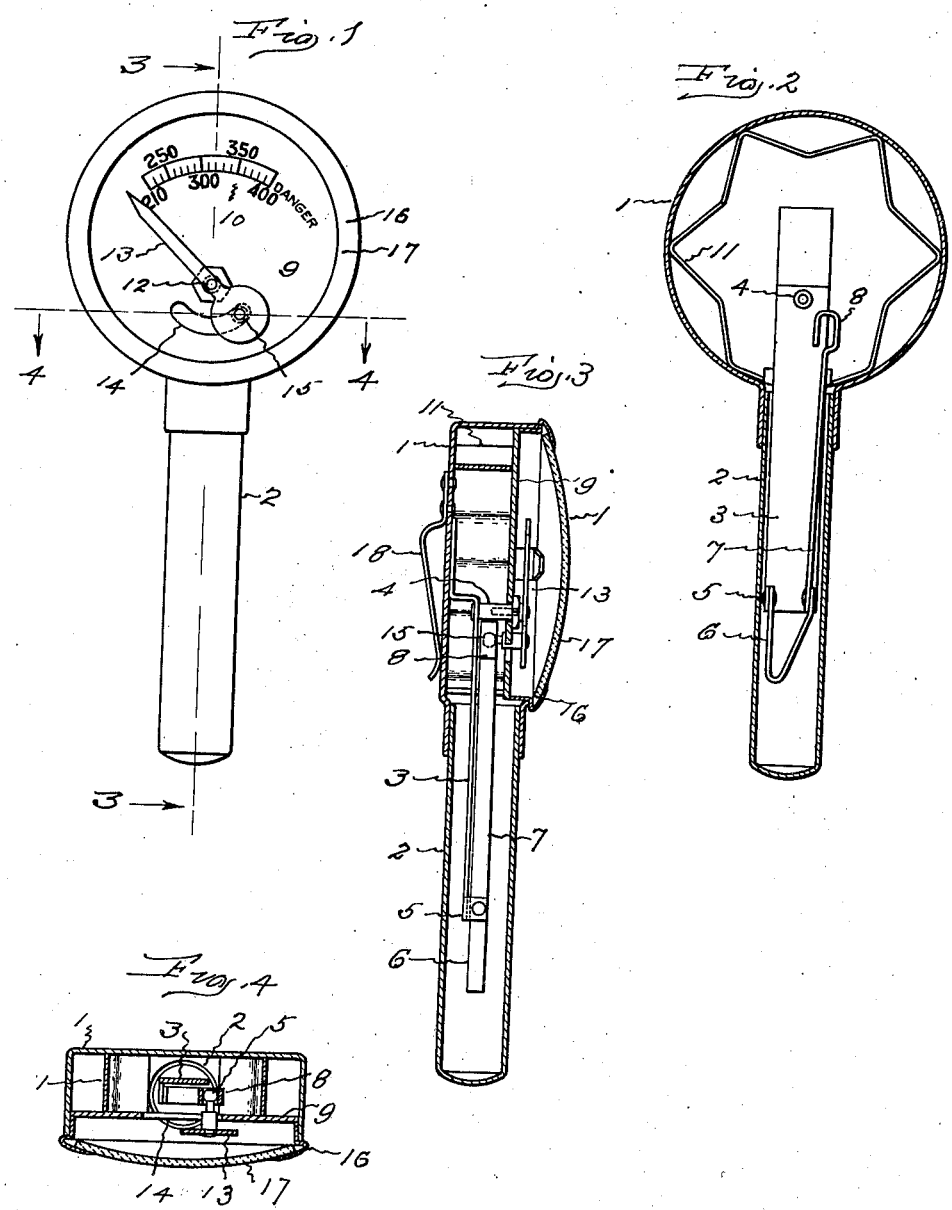
INVENTOR
Frederick A. Nodine by
Harry P. Williams
atty.

Patented Dec. 28, 1937

2,103,633

UNITED STATES PATENT OFFICE 2,103,633

THERMOMETER

Frederick A. Nodine, Terryville, Conn., assignor to The Cooper Oven Thermometer Company, Pequabuck, Conn., a corporation of Connecticut Application March 19, 1937, Serial No. 131,827

1 Claim. (Cl. 73—365)

This invention relates to the construction of thermometers that are more particularly designed for indicating the temperatures of liquids.

In the culinary art it is desirable in order to obtain the best results, to at any time be able to observe the temperature of the hot liquids, especially oleaginous liquids, in which substances are being cooked. In the industrial field it is requisite to know the temperatures of heated liquids—acidulated or saline, in which articles are to be treated. It has been common practice for determining such temperatures to employ mercury or spirit thermometers, which are inconvenient to read and are easily broken, or to use mechanical thermometers which are of considerable size and occupy an undue amount of the available space in the vessels containing the liquids.

The object of the present invention is to provide for culinary and industrial uses a simple, inexpensive and hardy mechanical thermometer of comparatively small size and capable of use in shallow vessels, which has a tightly sealed casing that is impervious to hot liquids and deleterious vapors, which is dependable, accurate and sensitive to temperature changes, and can be easily read.

This object is attained by so shaping, arranging and connecting a small thermo-responsive strip with temperature indicating means, that slight changes in the temperature to which the strip is subjected will produce extended and easily read movements of indicating means which can be observed without close inspection.

Fig. 1 of the accompanying drawing is a face view of a thermometer that embodies the invention.

Fig. 2 is a face view with the bezel, glass, pointer and dial plate removed and the protecting case and stem in section.

Fig. 3 is a vertical section on plane indicated by dotted line 3—3 on Fig. 1.

Fig. 4 is a horizontal section on plane indicated by dotted line 4—4 on Fig. 1.

The casing of the thermometer illustrated comprises a shallow cup 1 and a tubular stem 2 that projects from an opening in the peripheral wall of the cup. Secured to the bottom of the cup and extending into the stem is a metal plate 3. In the cup and rising forwardly from the plate is a hub 4. Attached to a lug 5 formed at the extremity of the plate and near the outer end of the tubular stem, is one end of a short U-shaped strip of thermo-responsive metal 6. Fastened to the free end of the thermo-responsive strip is an end of a metallic arm 7 which extends through the tubular stem and into the cup where its inner end is bent to provide a loop 8.

A dial 9, with temperature graduations and markings 10, is fitted in the cup. Means, such as a spider 11, are arranged to hold the dial near the front of the cup.

The hub 4, that projects from the plate 3, extends through the dial, and the arbor 12 of the pointer 13 is thrust into and is rotatably supported by this hub. Extending from the back of the pointer through a slot 14 in the dial and into the loop 8 at the free end of the arm 7 that is attached to the thermo-responsive strip 6, is a stud 15. Fitted to the open end of the cup is a bezel 16 which holds a crystal 17. Attached to the outside of the cup is a clip 18 that is capable of being engaged over the edge of a vessel containing the liquid the temperature of which is to be observed, or hooked on a basket or tray which holds substances or articles in the liquid.

A culinary use for which this thermometer is particularly adapted, is that of indicating the temperature of hot fat in which such foods as doughnuts, potatoes and etc. are fried. When used for such a purpose the thermometer is applied to the vessel containing the fat or to a basket or tray holding the food, with the tubular stem immersed in the fat so that the thermo-strip will be subjected to and will readily respond to the heat of the fat.

The thermo-strip is short and powerful, but very sensitive and although the movement of its free end is slight, as it is connected by a long non-thermal arm with the pointer near its pivot, a relatively extended movement over the dial indications is imparted to the free end of the pointer.

With the construction described the casing is small, comparatively thin, and moisture tight. But a small amount of the costly thermo-responsive metal is required to render the reading easily observed from a distance.

The invention claimed is:—

A thermometer which comprises a cup-shaped casing, a tubular stem extending from and opening into the casing, a rigid plate with one end attached to the back wall of said cup and its other end extending into said stem and having an integral outwardly bent lug, a short U-shaped thermo-responsive strip with one end attached to said lug, an arm extending from the free end of said strip through the stem and terminating in a loop in the casing, a dial with temperature indicia mounted in said casing, an oscillatory pointer movable over the dial, and a stud projecting from said pointer into the loop in the end of said arm.

FREDERICK A. NODINE.